United States Patent
Kharas et al.

[11] Patent Number: 5,897,846
[45] Date of Patent: Apr. 27, 1999

[54] CATALYTIC CONVERTER HAVING A CATALYST WITH NOBLE METAL ON MOLECULAR SIEVE CRYSTAL SURFACE AND METHOD OF TREATING DIESEL ENGINE EXHAUST GAS WITH SAME

[75] Inventors: Karl C. C. Kharas; Heinz J. Robota, both of Tulsa, Okla.

[73] Assignee: ASEC Manufacturing

[21] Appl. No.: 08/788,214

[22] Filed: Jan. 27, 1997

[51] Int. Cl.$^6$ .................. B01J 8/00; B01J 8/02; B01D 53/00; F01N 3/10
[52] U.S. Cl. .................. 423/213.2; 423/213.5; 423/239.1; 423/239.2; 422/177; 422/180
[58] Field of Search .................. 423/213.5, 213.2, 423/212, 239.1, 239.2; 422/180; 60/299; 502/66, 67

[56] References Cited

U.S. PATENT DOCUMENTS

| | | | |
|---|---|---|---|
| 3,775,342 | 11/1973 | Kronig et al. | 252/430 |
| 4,048,096 | 9/1977 | Bissot | 252/430 |
| 4,082,699 | 4/1978 | Petrow et al. | 252/472 |
| 4,556,646 | 12/1985 | Bezman | 502/66 |
| 4,608,356 | 8/1986 | Buss et al. | 502/66 |
| 4,683,214 | 7/1987 | Angevine et al. | 502/66 |
| 4,882,307 | 11/1989 | Tsao | 502/66 |
| 4,904,633 | 2/1990 | Ohata et al. | 502/304 |
| 4,992,158 | 2/1991 | Schweizer | 208/65 |
| 5,017,541 | 5/1991 | Schmidt et al. | 502/169 |
| 5,029,061 | 7/1991 | Shek | 363/21 |
| 5,041,272 | 8/1991 | Tamura et al. | 423/239 |
| 5,114,901 | 5/1992 | Tsang et al. | 502/240 |
| 5,189,876 | 3/1993 | Hirota et al. | 60/286 |
| 5,201,802 | 4/1993 | Hirota et al. | 60/276 |
| 5,233,830 | 8/1993 | Takeshima et al. | 60/278 |
| 5,284,638 | 2/1994 | Hertl et al. | 423/245.1 |
| 5,290,534 | 3/1994 | Tsao | 423/704 |
| 5,292,991 | 3/1994 | Lachman et al. | 585/850 |
| 5,314,854 | 5/1994 | Galperin | 502/66 |
| 5,376,610 | 12/1994 | Takahata et al. | 502/66 |
| 5,645,804 | 7/1997 | Sumiya et al. | 423/239.1 |

*Primary Examiner*—Wayne Langel
*Assistant Examiner*—Milan M. Vinnola
*Attorney, Agent, or Firm*—Kuffner & Associates

[57] ABSTRACT

A catalytic converter for treating exhaust gas from an internal combustion engine containing a catalyst characterized by having platinum or a platinum alloy dispersed predominately on the exterior surface of molecular sieve crystals. Also provided is a catalyst for such a converter and processes for manufacture of such catalyst. In addition, a process for treating exhaust gas from an internal combustion engine to reduce the amounts of hydrocarbon, carbon monoxide and nitrogen oxides emitted to the atmosphere is included.

11 Claims, 3 Drawing Sheets

0.1 μm

CATALYTIC CONVERTER HAVING A CATALYST WITH NOBLE METAL ON MOLECULAR SIEVE CRYSTAL SURFACE AND METHOD OF TREATING DIESEL ENGINE EXHAUST GAS WITH SAME

FIELD OF THE INVENTION

This invention relates to a catalytic converter containing therein a catalyst having noble metal dispersed on the surface of molecular sieve crystals. This invention further relates to a catalyst suitable for such converter, a process for treating the exhaust gas from an internal combustion engine, and processes for making a catalyst having noble metal dispersed on the exterior surface of molecular sieve crystals.

BACKGROUND OF THE INVENTION

Catalytic converters containing various catalysts have been employed for years by automobile manufacturers to meet the ever-more-stringent regulations on emissions of hydrocarbon, carbon monoxide, and particularly, nitrogen oxides from internal combustion engines. Concurrently with the promulgation of these ever-tightening regulations on emissions, automotive engine manufacturers have worked to improve the fuel economy of such engines.

This effort has led to the development of engines that operate with an excess of air beyond that which is required to consume stoichiometrically the fuel admitted to such engines ("lean-bum engines"). The advent of lean-bum engines has, in turn, exacerbated the problem of reducing emission of nitrogen oxides from internal combustion engines.

Various techniques have been developed to treat exhaust gas from internal combustion engines. One approach has been to provide multiple catalyst chambers in the exhaust system filled with different catalysts suited to particular tasks, such as that taught by Takeshima, et al. in U.S. Pat. No. 5,233,830.

Another approach is to provide a control system operating in conjunction with a catalytic converter, such as taught by Hirota, et al. in U.S. Pat. No. 5,201,802 and No. 5,189,876, and also by Takeshima in U.S. Pat. No. 5,029,061.

Clearly, there is a need for a simple system capable of treating exhaust gas from internal combustion engines, particularly the exhaust gas from lean-bum engines. The present invention is such a system, employing as it does a single catalytic converter having a single, unique catalyst contained therein which is capable of reducing the amount of hydrocarbon, carbon monoxide and, particularly, nitrogen oxides contained in exhaust gas prior to such gas's discharge to the atmosphere.

As stated above, the key element in such a system is the discovery of a catalyst which is effective in oxidizing hydrocarbon and carbon monoxide while being surprisingly effective at concurrently reducing nitrogen oxides in the environment presented by exhaust gas from internal combustion engines. Numerous inventions in this area have been taught by others skilled in the art, but none of these resembles more than superficially the catalyst of the present invention. For instance, U.S. Pat. No. 5,376,610 (Takahata, et al.) teaches, as part of a multi-catalyst system for exhaust gas purification, a catalyst consisting of alumina, and optionally zeolite, with Pt and/or Pd impregnated therein.

U.S. Pat. No. 5,292,991 (Lachman, et al.) teaches a catalyst consisting of a mixture of alumina and zeolite on a substrate with noble metal predominately dispersed on the alumina.

Patents have also been granted for catalysts intended for other uses, and some of these more closely resemble, at least superficially, the catalyst of the present invention. U.S. Pat. No. 5,314,854 (Galperin) teaches a catalyst designed primarily for the dehydrocyclization of paraffins to aromatics that consists of large pore molecular sieves mixed with binder and formed into pellets, spheres, or other such particles, said particles disclosed to have diameters greater than one millimeter. The particles are then provided with a surface-layer palladium component about 25 microns in thickness and uniformly dispersed platinum.

U.S. Pat. No. 4,992,158 (Schweizer) teaches a catalyst for reforming hydrocarbons having boiling points in the range of motor gasoline that is characterized as L-type zeolite not fully impregnated with Pt or Pd, using Pt- or Pd-acetylacetonate as the noble metal compound to treat the L-zeolite.

U.S. Pat. No. 5,017,541 (Schmidt, et al.) teaches a catalyst for the isomerization of alkanes consisting of particles of refractory inorganic oxide having a slightly higher concentration of a metal from the platinum group at the surface of such particles than at their center. The width of the surface-enriched band is 100–150 $\mu$m while the particles themselves have diameters of about 0.7–3.3 $\mu$m.

Still more patents have been granted for the preparation of noble metal/zeolite catalysts without regard to the use of same. U.S. Pat. No. 4,556,646 (Bezman) teaches a method for the preparation of a catalyst consisting of an inorganic oxide, a zeolite, and a noble metal in which ammonium nitrate is employed as an impregnating agent for Pd to produce a uniform distribution of the metal throughout the catalyst particles. Data are presented showing that, if ammonium nitrate is not used, Pd is concentrated in the outer shell of the catalyst particles. In this case, however, the Pd is deposited on the inorganic oxide as well as the zeolite, and the inventor suggests that deposition of Pd in the outer shell is a condition to be avoided.

U.S. Pat. No. 4,882,307 (Tsao) teaches the use of various salts, including sulfites, of cationic Pt complexes as an agent for the deposition of Pt into zeolite as a way of yielding highly dispersed Pt crystallites, after appropriate treatments.

U.S. Pat. No. 4,683,214 (Angevine, et al.) also teaches the use of sulfite salts of cationic noble metal complexes as a means of depositing noble metal on zeolite to yield, after appropriate treatment, very highly dispersed metal crystallites.

And, finally, U.S. Pat. No. 5,290,534 (Tsao) teaches that when a noble metal precursor is placed into a reactor during the production or synthesis of ZSM-18 substantially all of the noble metal remains on the outside of the synthesized ZSM-18. No indication is given that this is a desirable result, however, since the point of this invention is to provide a method of removing organic material blocking the pores of a zeolite.

SUMMARY OF THE INVENTION

It is a feature of the invention that superior catalytic converters for removing $NO_x$ from the exhaust of internal combustion engines that are operating with the air-to-fuel ratio in the lean range, that is, where the amount of oxygen supplied is greater than the stoichiometric amount needed to support combustion.

This invention provides for a catalytic converter suitable for treating exhaust gas from an internal combustion engine, and particularly for treating the gas from a lean-burn motor vehicle engine. The catalytic converter of the present invention comprises an exhaust gas processing vessel of suitable size and shape that is adapted to receive exhaust directly from the engine. Contained in this vessel is an effective amount of a catalyst coating uniformly dispersed on a suitable substrate. The substrate, in turn, is adapted to fit within the vessel in such a way as to assure that the exhaust gas adequately and effectively contacts the catalyst coating on the substrate.

The catalyst coating for use in this invention is characterized as containing molecular sieve crystals on the surface of which has been uniformly dispersed a catalytically effective amount of a noble metal, preferably platinum or a platinum alloy. The molecular sieve crystals on which the noble metal has been dispersed have diameters within a range of about 0.5 to about 50 $\mu$m. The noble metal is dispersed on the surface of the molecular sieve crystals in such a manner as to locate at least 90% of the noble metal within 500 Å of the exterior surface of the crystals.

This invention also provides a catalyst for such a catalytic converter and processes for making such catalyst. In one process for making the catalyst according to this invention such that the noble metal is dispersed predominantly on the exterior surface of the molecular sieve crystals, the first step is to prepare an aqueous suspension of the molecular sieve crystals and a noble metal reagent that will chemisorb onto the exterior 500 Å of the said crystals. Sufficient acid or base may be added to the suspension to adjust the pH to between about 7–8. Any pH adjustment should be done using a material that will decompose to yield gaseous products when its temperature is raised above about 150° C. After adequate stirring the suspension is coated onto a suitable substrate, dried and calcined at a temperature sufficient to decompose the base reagent material. Appropriate noble metal reagents that, when suspended in water, will chemisorb onto the exterior 500 Å of said crystals include Pt sulfite and $[N(C_2H_5)_4]_2 [Pt(OH)_6]$.

Alternatively, a catalyst containing molecular sieve crystals of at least one type having noble metal dispersed predominantly on the exterior surface of the crystals can be made by a process in which the first step is to prepare an aqueous suspension of the crystals with a hydrophilic polymer having a density between about 0.8 and about 1.0 gm/cm$^3$, the amount of polymer used being sufficient to fill the pores of the molecular sieve crystals used. Thereafter a suitable noble metal reagent (which need not be chemisorbing) is added to the suspension, the pH adjusted to between about 7 and 8, and the suspension then coated on a suitable substrate, dried and calcined. In the process of heating, the material used to adjust the pH and the hydrophilic polymer are completely burned off and vaporized, thereby leaving the noble metal dispersed uniformly on the first 500 Å of the molecular sieve crystals. Finally, processes for treating exhaust gas from an internal combustion engine using the catalytic converter and catalyst of the present invention.

DETAILED DESCRIPTION OF THE INVENTION

Figure 1:
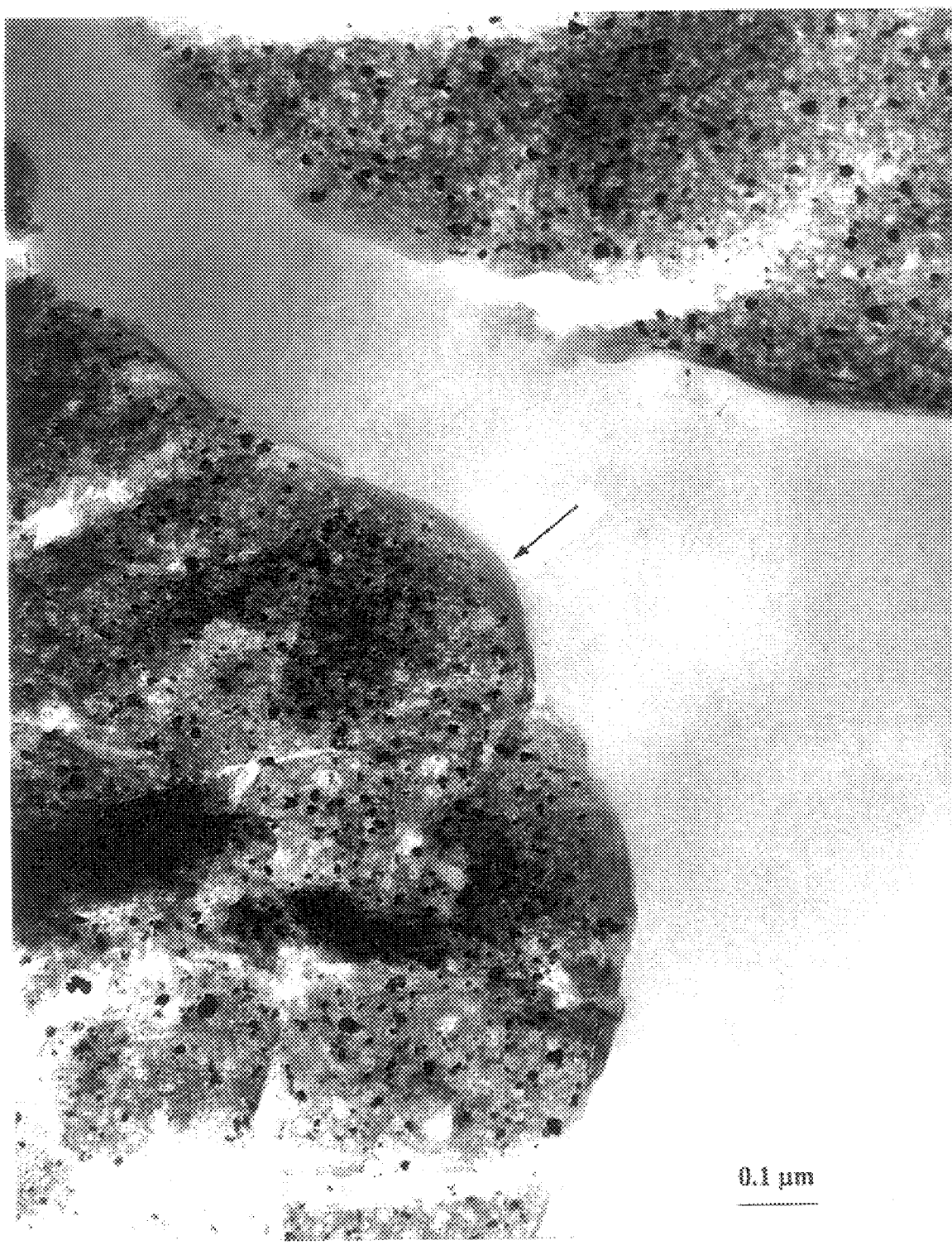
FIG. 1 is a micrograph of the powder used to coat the monolith in one embodiment of the present invention.

The catalytic converter of the present invention comprises a vessel and a catalyst contained in the vessel.

Vessel

The exhaust gas processing vessel may be any suitable shape and configuration, with cylindrical and "flattened" cylindrical (i.e., an extended oval) being the preferred shapes, to provide a substantially uniform distribution of exhaust gas throughout and an efficient flow over the catalyst to be contained therein. The vessel should have sufficient void volume in relation to size and surface area of the catalyst so that the gas hourly space velocity ("GHSV") over the catalyst is no greater than about 150,000 hr$^{-1}$ when the engine producing the exhaust gas to be treated is operating at its maximum sustainable speed and load. The vessel should be fitted at its inlet end with a tubular conduit adapted to receive exhaust from the engine exhaust manifold, and at its outlet end with a tubular conduit adapted to transmit treated exhaust to a muffler or directly to the atmosphere. Materials of construction of the vessel and inlet and outlet conduits are well known to those skilled in the art and may be of any metal or composite able to withstand temperatures of up to about 1200° C. with minimal corrosion from the compounds normally contained in internal combustion engine exhaust gas.

Catalyst

The catalyst is comprised of a substrate on which has been suitably applied an effective amount of a catalytically active coating containing at least one type of molecular sieve crystals, with platinum or a platinum alloy uniformly dispersed on the exterior surface of such crystals. The coating may also contain a binder and one or more types of molecular sieve crystals.

Substrate

The substrate may be any of the shapes employed by those skilled in the art such as extrudates, spheres, beads, tablets, and the like, but monoliths, either metallic or ceramic, are preferred. The substrate should be inert in the sense that it does not react with the coating or with the exhaust gas to which it is exposed during engine operation.

If a monolith is employed as the substrate, it should be sized and shaped so that it fits within the vessel and leaves no gaps between the vessel interior wall and the outside surface of the monolith which might result in blow-by of the exhaust gas past the monolith (i.e., bypassing of the catalyst). Ceramic monoliths, if employed, should be provided with a mat-mount between the exterior surface of the monolith and the vessel wall, as is customary in the industry, to cushion vibration during engine operation and also to prevent blow-by of the engine exhaust gas past the catalyst. Metallic monoliths should be attached to the vessel wall, as is customary. There should be provided sufficient monolith to result in a GHSV as defined above in the discussion on Vessel.

Coating

The coating is comprised of suitable molecular sieve crystals, onto the exterior surface of which crystals a catalytically effective amount of platinum or a platinum alloy has been dispersed in a manner such that at least 90% of the platinum or platinum alloy is deposited within the exterior 500 Å of the surface of such crystals. An inorganic oxide binder may be included in the coating, but it is an important aspect of this invention that little of the platinum or platinum alloy be deposited on such inorganic oxide binder. If a binder is employed it is important that the binder and molecular sieve crystals be thoroughly mixed so that the crystals are uniformly dispersed throughout the coating.

The coating should be applied uniformly to the substrate. The coating's thickness should be no more than about 200 microns and no less than about 1 micron, with a coating thickness averaging between about 20 microns and 40 microns being preferred. Any method known to those skilled in the art including, without limitation, immersion of the substrate in an aqueous suspension of the desired coating or spraying of the suspension onto the substrate, may be employed to achieve the desired coating thickness and uniformity of application. The preferred method of application onto monoliths is "piston coating", which involves placing the monolith above a reservoir containing an amount of the coating, compressing the coating up into the monolith with a piston, withdrawing the piston to permit the coating to drain back into the reservoir, and then immediately clearing the channels of the monolith with a slotted knife that emits compressed air. This method is particularly useful when applying coatings containing large mass fractions of molecular sieves since the sieve density is quite low.

Following application of the coating to the substrate, the coated substrate is dried and then calcined at a temperature of between about 400 and about 550° C. for 2 to 4 hours.

Molecular sieve

Only a single type of molecular sieve crystal is necessary as the catalyst support in the present invention. Any type of molecular sieve having an average pore size between about 4 Å and about 10 Å may be used, with the preferred type being USY having a pore size between 7 Å and 8 Å. The size of the crystals, regardless of the type of sieve chosen, should be between 0.5 and 50 microns, however, and a crystal size between about 1 and about 2 microns is preferred. The silica/alumina ratio should be between about 10 and about 100,000, preferably between about 10 and about 100. Optionally, the sieve crystals may be treated to expose acid sites on the crystal surface.

Some applications, however, such as those in which it is desirable to adsorb hydrocarbon during cold start of an engine, might benefit from incorporation into the coating of a second, or even a third, type of sieve having characteristics desirable to that application. For instance, in a catalytic converter intended for treatment of diesel exhaust, it might be desirable to employ two types of sieve, one with an average pore size less than 6 Å on which platinum or a platinum alloy has been dispersed and another (with an average pore size greater than 6 Å) which is capable of adsorbing the larger hydrocarbon molecules present in the exhaust gas from such diesel engines. This larger-pore sieve would not necessarily require platinum or a platinum alloy dispersed thereon since conversion of hydrocarbon, carbon monoxide, and nitrogen oxides would be catalyzed primarily by the smaller-pore sieve.

Binder

As is the case with many catalysts, it is sometimes desirable to incorporate with the zeolite another material resistant to the temperatures and other conditions encountered in the environment to which the catalyst is to be exposed. Often, these materials are inactive, thereby serving as diluents so that the desired conversion can be obtained economically without employing other means for controlling the rate of reaction. At other times, a binder may serve to improve the adhesion of the zeolite-containing coating to the substrate. Binders useful for compositing with the zeolites of this invention include inorganic oxides such as alumina, silica, alumina-silicates, titania, magnesia, zirconia, beryllia, and mixtures thereof, with alumina, titania, and zirconia being preferred, and with milled alumina being particularly preferred.

The relative proportions of finely divided zeolite crystals and inorganic oxide binder may vary widely with the zeolite content ranging from about 1 to about 90 weight percent, and more usually in the range of about 10 to about 50 weight percent of the composite.

Noble Metal

Platinum used alone is the preferred noble metal for use in this invention. In addition, however, platinum alloyed with a minor amount of rhodium, iridium, palladium, silver, or gold may be employed as the noble metal.

Preparation of Catalyst

The key element of the present invention is that the platinum or platinum alloy be dispersed predominately on the exterior surface of the zeolite crystals chosen for the particular application, and preferably so that a very high proportion, above 90%, of the platinum or the platinum alloy is sited within 500 Å of the exterior crystal surfaces. It has been discovered that there are a number of methods of dispersing platinum or platinum alloy on zeolite in a suitable manner. These methods involve contacting a suspension of a platinum or a platinum alloy salt with the zeolite crystals on which the platinum or a platinum alloy is to be dispersed in the absence of any other type of zeolite crystals or any inorganic oxide binder which is or are to be included in the catalyst.

One such method employs, as the depositing agent for platinum or a platinum alloy, compounds that will chemisorb predominately on and near the exterior surface of the zeolite crystals. This method is particularly preferred. These compounds include Pt sulfite, $[N(C_2H_5)_4]_2$ $[Pt(OH)_6]$, and Pt ethanolamine, with Pt sulfite being preferred. The Pt sulfite employed in this invention should be a non-cationic square planner Pt complex in which each Pt has two Pt-S bonds and whose charge is believed to be between −4 and zero, depending on pH.

Another method involves pretreatment of the zeolite crystals on which platinum or a platinum alloy is to be dispersed with a sufficient amount of a suitable hydrophilic polymer prior to exposure of the crystals to a platinum species or a platinum alloy suspended in water. The hydrophilic polymer should be applied so as to fill up or block a sufficient number of the zeolite pores to intrusion of platinum species or a platinum alloy colloid into the crystal interior. The hydrophilic polymer will be subsequently removed completely from the catalyst during calcining of the finished catalyst. Some hydrophilic polymers suitable for this purpose include polyethylene glycol, polyvinyl glycol and polyvinyl pyrollidone, with polyethylene glycol being particularly preferred.

A third method employs, as the depositing agent for platinum or a platinum alloy, metallic colloidal particles of platinum or a platinum alloy of a size substantially greater, by at least a factor of two, than the largest crystallographically defined pore diameter of the molecular sieve crystals onto which the noble metal is to be deposited.

A fourth method, involving placing a noble metal precursor into the reactor during the production or synthesis of a zeolite, is taught in U.S. Pat. No. 5,290,534 (Tsao).

Preparation Using Pt Reagents that Chemisorb onto Zeolite Crystal Exterior Surface In this preferred method of preparation, an amount of platinum or platinum alloy reagent capable of being chemisorbed onto the exterior of molecular sieve crystals is mixed with an aqueous suspension of the type and size of molecular sieve crystals to be employed in the catalyst. If Pt sulfite is to be used as the Pt reagent, it is important that the molecular sieve crystals to be used have been de-aluminated to some degree, as by exposure to steam, thereby creating a very thin film of aluminum oxide on the crystalline surfaces. This has been found to be necessary to promote deposition of Pt sulfite on the crystalline surface.

The amount of noble metal reagent added should be determined by the noble metal loading desired in the catalyst to be prepared. The range of noble metal loadings should be between 0.05% and 10% of sieve weight, with the preferred range being between about 1 and about 3 weight % of sieve weight. Sufficient base is then added to the suspension to raise its pH to above about 7. The base employed should be one that will decompose to yield gaseous products when its temperature is raised above about 150° C., and the preferred base is tetramethylammonium hydroxide. The suspension is then stirred long enough to allow the noble metal reagent to be chemisorbed onto the molecular sieve crystals, typically a period of at least one hour.

If another type of molecular sieve crystals is to be included in the catalyst being prepared, an aqueous suspension of this second type of molecular sieve is then added to the suspension already prepared. Along with this second type of molecular sieve, or instead of it if only one type of molecular sieve is to be included in the catalyst, an aqueous suspension of a suitable binder, preferably one such as alumina, titania, or zirconia, may optionally be added to the mixture already prepared. The entire mixture is then stirred for a period of time sufficient to thoroughly mix the compounds that have been included in the suspension.

The suspension as prepared is then applied to a substrate, preferably a monolith, by any of the methods known to those skilled in the art, and preferably by piston coating, to achieve the desired thickness of coating disposed on the substrate. It is then dried and calcined by any of a number of methods known to those skilled in the art.

Preparation Using Hydrolphilic Polymer

In this method of catalyst preparation, a hydrophilic polymer is employed to fill the pores of the molecular sieve crystals prior to application of platinum or a platinum alloy to the crystals, thereby preventing the platinum or a platinum alloy from being deposited other than on the surface of the crystals.

Suitable hydrophilic polymers will be any such polymer having a density of between about 0.8 and 1.0 gm./cm.$^3$ and that completely volatilizes at calcining temperatures. Preferred polymers for this application include, without limitation, polyethylene glycol, polyvinyl glycol and polyvinyl pyrollidone. Polyethylene glycol is particularly preferred.

In this method of catalyst preparation then, an amount of hydrophilic polymer sufficient to fill the pores of the molecular sieve crystals, without overfilling thereby leaving polymer on the surface of the crystals, is added to an aqueous suspension of the molecular sieve to be used, and the suspension is stirred for a period of at least 30 minutes to promote adsorption of the polymer in the pores of the crystals. A suitable method for determining the amount of polymer to apply is:

1) the pore volume per unit mass of the molecular sieve to be employed is measured;
2) a concentrated solution of a hydrophilic polymer is prepared and the density of the solution is determined;
3) the quantity of the hydrophilic polymer solution to be added to the molecular sieve is set so that the product of the mass of the sieve to be treated times the sieve's pore volume per unit mass of sieve times the density of the hydrophilic polymer solution divided by the mass of polymer solution is between 1 and 0.25.

Following adsorption of the polymer into the crystal pores, a quantity of de-ionized water may be added to the solution to yield an appropriate coating precursor.

Any platinum or a platinum alloy reagent known to those skilled in the art is then added to the suspension in an amount determined to provide the desired platinum or platinum alloy loading on the final catalyst, in a similar manner to the method described above. The remainder of this procedure is the same as for the procedure above using those platinum or platinum-alloy reagents that chemisorb preferentially on the surface of the molecular sieve crystals.

Preparation Using Colloidal Particles of Noble Metal

This method of preparation is very similar to the method described above using Pt reagents that chemisorb onto the exterior surface of molecular sieve crystals.

An aqueous suspension of colloidal particles of platinum or platinum alloy is added to an aqueous suspension of molecular sieve crystals. It is necessary that the size of the colloidal particles be at least twice the largest crystallographically defined pore diameter of the molecular sieve crystals so that the crystals cannot enter the crystal pores, and are therefore adsorbed on the surface of the crystals. The pH may optionally be adjusted to promote chemisorption of the colloidal metal onto the molecular sieve.

EXAMPLE

This example describes the preparation of a catalyst of the present invention and characterizes the resultant coating.

An aqueous suspension of ultrastable Y molecular sieve that had been partially de-aluminated by exposure to steam was prepared and sufficient Pt sulfite was added to yield molecular sieve crystals having about 2 wt. % Pt on sieve. Sufficient tetramethylammonium hydroxide was added to raise the pH to about 7 and the suspension was then stirred for several hours to permit chemisorption reactions between the Pt sulfite and the molecular sieve crystals to occur. Then a milled suspension of Condea SCFA-90, consisting predominately of θ-alumina, was added without the normal addition of acid that partially peptizes the alumina. The mixture was then stirred for several hours, dried and calcined.

A sample of this material was analyzed by cutting thin sections of particles contained in the sample. FIG. 1 is a micrograph of these particles. It is clear from this figure that Pt is not found throughout the bulk of the molecular sieve crystals; rather, Pt does occur at the exterior surface of the molecular sieve crystals, appearing as dark particles.

EXAMPLE 2

Comparative

This example describes the preparation of a catalyst that has been suggested in the prior art for use to treat exhaust gas from an internal combustion engine.

Figure 2:
FIG. 2 is a micrograph of a thin section of the inside, together with portions of their exterior edges, of two molecular sieve crystals taken from the coating of a catalyst prepared by one of the methods presented herein but using a platinum reagent that does not chemisorb onto the exterior surface of molecular sieve crystals. This catalyst is typical of platinum-containing molecular sieve catalysts that have been suggested in the prior art for use to treat exhaust gas from an internal combustion engine.

A catalyst sample was prepared using the same method as employed in Example 1, except that $[Pt(NH_3)_4][OH]_2$ was used as the platinum reagent instead of Pt sulfite. Again, a sample of this material was analyzed by cutting thin sections of particles contained in the sample. FIG. 2 is a micrograph of these particles. In this figure is shown dark particles throughout the bulk of the sieve crystals. An arrow points to a film on the surface of the crystal. It should be noted that no platinum is present on this film; rather, the platinum is present in regions away from the edges. The possibility that those platinum particles are at the exterior surface can be dismissed since, in the regions where platinum is seen, the exterior surface has been cut away.

EXAMPLE 3

Comparative

This example compares the performance (as measured by $NO_x$ conversion) of the catalyst prepared by the process described in Example 1 against that of the system prepared in Example 2.

Catalytic converters were manufactured using the suspensions prepared in Examples 1 and 2 applied to equivalent size and type monoliths followed by drying and calcining. One converter at a time was connected to the exhaust pipe of a Peugeot IDI, turbocharged U60 engine. Catalyst inlet temperature was varied at constant speed (1540 rpm) by variation of the load placed on the engine, i.e., as load increased, inlet temperature increased. Diesel fuel was injected into the exhaust gas between the engine outlet and the converter inlet to adjust the hydrocarbon/$NO_x$ ratio to 10 at each load set point. $NO_x$ concentrations were determined using a chemiluminescent $NO_x$ analyzer.

Figure 3:
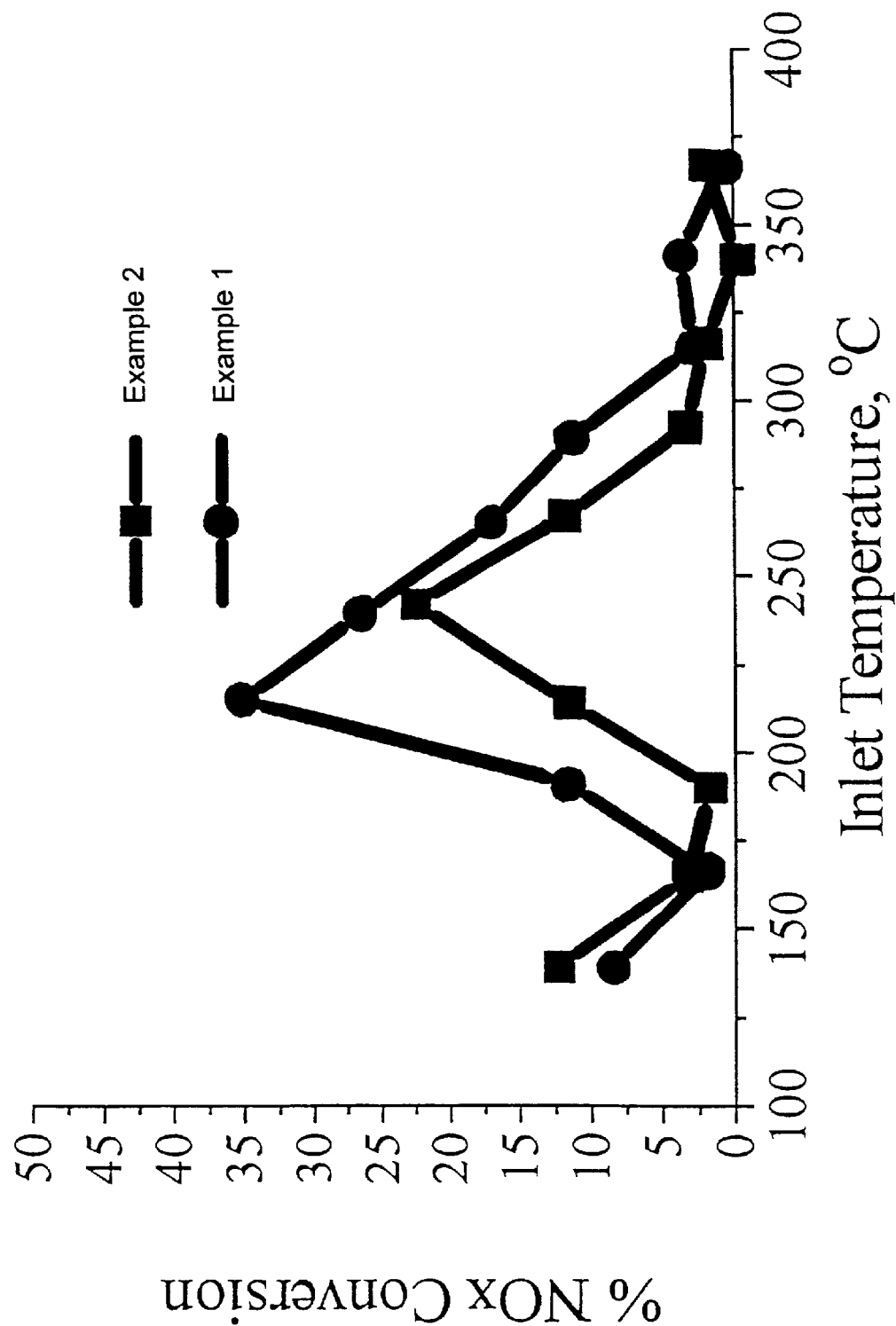
FIG. 3 presents data comparing the performance (shown as NO$_x$ conversion) of the present invention against that of a typical catalytic converter using a typical catalyst when used to treat exhaust gas from the same lean-burn diesel engine.

The results of this test are shown in FIG. 3. $NO_x$ conversion versus converter inlet temperature is plotted for each of the converters, with the performance of the converter using the catalyst prepared as in Example 1 shown as solid circles, ●, and that of the converter using the system prepared as in Example 2 as solid squares, ■. It is clear that the converter of the present invention demonstrates far superior $NO_x$ conversion compared to the converter using a typical catalyst formulation. $NO_x$ conversion begins at a lower temperature, reaches a higher maximum, and continues at a higher level over the entire temperature range of interest.

We claim:

1. A catalytic converter for treating exhaust gas from a motor vehicle internal combustion engine comprising:
    an exhaust gas processing vessel of suitable size and shape, adapted to receive exhaust directly from the engine; and an effective amount, contained in said vessel, of a catalyst coating uniformly dispersed on a substrate adapted to fit within said vessel, said coating comprising at least one type of molecular sieve crystals, and optionally a binder, said sieve crystals having diameters within a range of 0.5 μm to 50 μm said at least one type of crystals further having a catalytically effective amount of noble metal dispersed thereon in a manner such that at least 90% of the noble metal is located within 500 Å of the exterior surface of such crystals.

2. The catalytic converter of claim 1 wherein said crystals are evenly dispersed throughout said coating and said coating is between 1 μm and 200 μm thick.

3. The catalytic converter of claim 1 wherein the substrate is a monolith.

4. The catalytic converter of claim 1 wherein said binder is selected from a group consisting of alumina, silica, alumina-silicates, titania, magnesia, zirconia, beryllia, and mixtures thereof.

5. The catalytic converter of claim 1 wherein the noble metal is selected from the group consisting of Pt and Pt alloyed with Rh, Ir, Pd, Ag, or Au.

6. The catalytic converter of claim 1 wherein only one type of molecular sieve crystals is employed.

7. A method for treating the exhaust from a motor vehicle diesel engine to reduce the amounts of hydrocarbon, carbon monoxide and $NO_x$ emitted to the atmosphere which comprises passing the exhaust through the catalytic converter of claim 1.

8. The method of claim 7 further including the step of injecting into the exhaust gases before they are passed through the converter an amount of diesel fuel adequate to assure maximum $NO_x$ reduction.

9. A method for treating the exhaust from a motor vehicle diesel engine to reduce the amounts of hydrocarbon, carbon monoxide and $NO_x$ emitted to the atmosphere which comprises passing the exhaust gas through a converter containing a catalyst containing at least one type of molecular sieve crystals having noble metal predominantly on the exterior surface of at least one type of said molecular sieve crystals made by a process comprising:
    a) preparing an aqueous suspension of at least one type of molecular sieve crystals and a noble metal reagent, said reagent being of the type that, when suspended in water, will chemisorb onto the exterior 500 Å of said crystals;
    b) adding sufficient base to the suspension to raise its pH to above about 7, said base being of a type that will decompose to yield gaseous products when its temperature is raised above about 150° C.;
    c) stirring for at least one hour;
    d) adding an aqueous suspension of at least one type of molecular sieve crystals different from the type employed in step (a) to the product of step (c);
    e) adding an aqueous suspension of binder to the product of step (d);
    f) stirring the product of step (e) for at least one hour;
    g) coating a substrate with the product of step (f) thereby preparing a coated substrate; and
    h) drying and calcining said coated substrate.

10. A method for treating the exhaust from a motor vehicle diesel engine to reduce the amounts of hydrocarbon, carbon monoxide and $NO_x$ emitted to the atmosphere which comprises passing the exhaust gas through a converter containing a catalyst containing at least one type of molecular sieve crystals having noble metal predominantly on the exterior surface of at least one type of said molecular sieve crystals made by a process comprising;
    a) preparing an aqueous suspension of at least one type of molecular sieve crystals and an amount of a hydrophilic polymer having a density of between about 0.8 and about 1.0 gm/cm$^3$, said amount of hydrophilic polymer being sufficient to fill the pores of said molecular sieve crystals:

b) adding a noble metal reagent to the product of step (a);

c) adding sufficient base to the suspension to raise its pH to above about 7, said base being of a type that will decompose to yield gaseous products when its temperature is raised above about 150° C.;

d) stirring for at least one hour;

e) adding an aqueous suspension of at least one type of molecular sieve crystals different from the type employed in step (a) to the product of step (d);

f) adding an aqueous suspension of binder to the product of step (e);

g) stirring the product of step (f) for at least one hour;

h) coating a substrate with the product of step (g) thereby preparing a coated substrate; and i) drying and calcining said coated substrate.

11. A method for treating the exhaust from a motor vehicle diesel engine to reduce the amounts of hydrocarbon, carbon monoxide and $NO_x$ emitted to the atmosphere which comprises passing the exhaust gas through a converter containing a catalyst containing at least one type of molecular sieve crystals having noble metal predominantly on the exterior surface of at least one type of said molecular sieve crystals made by a process comprising:

a) preparing an aqueous suspension of at least one type of molecular sieve crystals and colloidal particles of noble metal the size of said noble metal particles being at least twice the largest crystallographically-defined pore diameter of the molecular sieve crystals;

b) adjusting the suspension pH to between about 7 and about 8.;

c) stirring for at least one hour;

d) adding an aqueous suspension of at least one type of molecular sieve crystals different from the type employed in step (a) to the product of step (c);

e) adding an aqueous suspension of binder to the product of step (d);

f) stirring the product of step (e) for at least one hour;

g) coating a substrate with the product of step (f) thereby preparing a coated substrate; and h) drying and calcining said coated substrate.

* * * * *